(12) United States Patent
Fujitani et al.

(10) Patent No.: US 12,244,845 B2
(45) Date of Patent: Mar. 4, 2025

(54) IMAGE PROCESSING APPARATUS CAPABLE OF CONVERTING IMAGE FILE SUCH THAT ALL ANNOTATION INFORMATION CAN BE USED, CONTROL METHOD THEREFOR, AND STORAGE MEDIUM

(71) Applicant: CANON KABUSHIKI KAISHA, Tokyo (JP)

(72) Inventors: Yohei Fujitani, Kanagawa (JP); Noboru Omori, Kanagawa (JP); Yuma Naito, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 37 days.

(21) Appl. No.: 18/322,674

(22) Filed: May 24, 2023

(65) Prior Publication Data

US 2023/0388533 A1    Nov. 30, 2023

(30) Foreign Application Priority Data

May 27, 2022 (JP) .................................. 2022-086537

(51) Int. Cl.
*H04N 19/46* (2014.01)
*G06F 16/51* (2019.01)
(Continued)

(52) U.S. Cl.
CPC ............. *H04N 19/46* (2014.11); *G06F 16/51* (2019.01); *H04N 1/00148* (2013.01);
(Continued)

(58) Field of Classification Search
CPC .. H04N 19/46; H04N 19/625; H04N 1/00148; H04N 1/32101; H04N 23/61;
(Continued)

(56) References Cited

U.S. PATENT DOCUMENTS 11,011,202 B2    5/2021 Omori
2023/0385245 A1*  11/2023 Usui ...................... H04N 23/61

FOREIGN PATENT DOCUMENTS

JP           2020-091702 A      6/2020

* cited by examiner

*Primary Examiner* — James M Hannett
*Assistant Examiner* — John H Morehead, III
(74) *Attorney, Agent, or Firm* — Venable LLP

(57) ABSTRACT

An image processing apparatus that is capable of converting an image file such that all annotation information recorded in the image file can be used. When converting a first-format image file including image data and annotation information on the image data to a second-format image file whose memory capacity of a predetermined area, where annotation information is recorded, is less than that of the first-format image file, the image processing apparatus, when the annotation information included in the first-format image file is not predetermined annotation information whose data amount is equal to or greater than a predetermined value, records the annotation information into the predetermined area in the second-format image file, and, when the annotation information included in the first-format image file is the predetermined annotation information, records link information on the annotation information in the predetermined area in the second-format image file.

8 Claims, 12 Drawing Sheets

(51) Int. Cl.
*H04N 1/00* (2006.01)
*H04N 1/32* (2006.01)
*H04N 23/61* (2023.01)
*H04N 101/00* (2006.01)

(52) U.S. Cl.
CPC ......... *H04N 1/32101* (2013.01); *H04N 23/61* (2023.01); *H04N 2101/00* (2013.01); *H04N 2201/0065* (2013.01); *H04N 2201/3261* (2013.01)

(58) Field of Classification Search
CPC ....... H04N 2101/00; H04N 2201/0065; H04N 2201/3261; G06F 16/51
See application file for complete search history.

IMAGE PROCESSING APPARATUS CAPABLE OF CONVERTING IMAGE FILE SUCH THAT ALL ANNOTATION INFORMATION CAN BE USED, CONTROL METHOD THEREFOR, AND STORAGE MEDIUM

CROSS REFERENCE TO PRIORITY APPLICATION

This application claims the benefit of Japanese Patent Application No. 2022-086537, filed May 27, 2022, which is hereby incorporated by reference herein in its entirety.

BACKGROUND OF THE INVENTION

Field of the Invention

The present invention relates to an image processing apparatus capable of converting an image file such that all annotation information can be used, a control method therefor, and a storage medium.

Description of the Related Art

Lately, AI (Artificial Intelligence) technologies such as deep learning have been used in various technical fields. For example, for digital cameras having the function of detecting human faces from image data obtained by shooting, a technique for accurately detecting, using an inference model, targets other than people, such as animals, plants, buildings, and objects has been proposed (see, for example, Japanese Laid-Open Patent Publication (Kokai) No. 2020-91702). A technique for recording information on detected targets as annotation information in association with image data has also been proposed. Specifically, an image file in which image data and annotation information are recorded, is generated. For example, recording, as annotation information, information indicating the area of a detected target by a point, a rectangle, a circle, or the like, is being contemplated. Cutting out image data of a detected target as related image data of original image data and recording the cut-out image data in association with the original image data is also being contemplated. In addition, recording the properties such as color, shape, and type, of the cut-out image data in association with the original image data is being contemplated.

On the other hand, digital cameras are equipped with the function of converting a RAW image file or an HEIF (High Efficiency Image File Format) image file to a JPEG image file that has higher reproduction compatibility.

A JPEG image file has a small memory capacity of an area where annotation information is recorded as compared to image files in other formats such as HEIF. For this reason, when a RAW image file or an HEIF image file is converted to a JPEG image file, all annotation information recorded in a pre-conversion image file cannot be recorded in the JPEG image file. As a result, a part of the annotation information recorded in the pre-conversion image file cannot be used in the post-conversion image file.

SUMMARY OF THE INVENTION

The present invention provides an image processing apparatus that is capable of providing a post-conversion image file in which all of annotation information recorded in a pre-conversion image file can be used, a control method therefor, and a storage medium.

Accordingly, the present invention provides an image processing apparatus comprising at least one memory that stores a set of instructions, and at least one processor that executes the instructions, when being executed, causing the image processing apparatus to convert a first-format image file including image data and annotation information on the image data to a second-format image file, whose memory capacity of a predetermined area where annotation information is recorded, is less than that of the first-format image file, wherein the at least one processor executes instructions causing the image processing apparatus, in a case when the annotation information included in the first-format image file is not predetermined annotation information whose data amount is equal to or greater than a predetermined value, to record the annotation information included in the first-format image file into the predetermined area in the second-format image file, and in a case where the annotation information included in the first-format image file is the predetermined annotation information, record link information on the annotation information included in the first-format image file into the predetermined area in the second-format image file.

According to the present invention, it is possible to provide a post-conversion image file in which all of annotation information recorded in a pre-conversion image file can be used.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof. It should be noted that the embodiment described below does not limit the claimed invention. The embodiment described below has a plurality of features, but all of the features should not always be essential for the invention, and the features can be arbitrarily combined together. Moreover, in the accompanying drawings, the same or equivalent features are designated by the same reference symbols, and duplicate descriptions thereof are omitted.

In the following description, a digital camera that classifies subjects using an inference model is taken as an example of an image processing apparatus according to the present embodiment, but the image processing apparatus is not limited to the digital camera. For example, the image processing apparatus has only to be an apparatus such as a smartphone or a tablet PC that converts an image file such as an HEIF file stored in a storage unit into an image file in another format.

Moreover, in the present embodiment described below, an HEIF image file as a first-format image file is converted to a JPEG image file as a second-format image file, but the present invention is not limited to this. The first-format image file has only to have a configuration in which it includes image data and annotation information on the image data, and the storage capacity of a predetermined area where the annotation information is stored is greater than that of the image file in the second file format, and may be an image file in another format other than HEIF. The second-format image file has only to have a configuration in which the storage capacity of a predetermined area where the annotation information is stored is less than that of the first-file image file, and may be an image file in another format other than JPEG.

Figure 1:
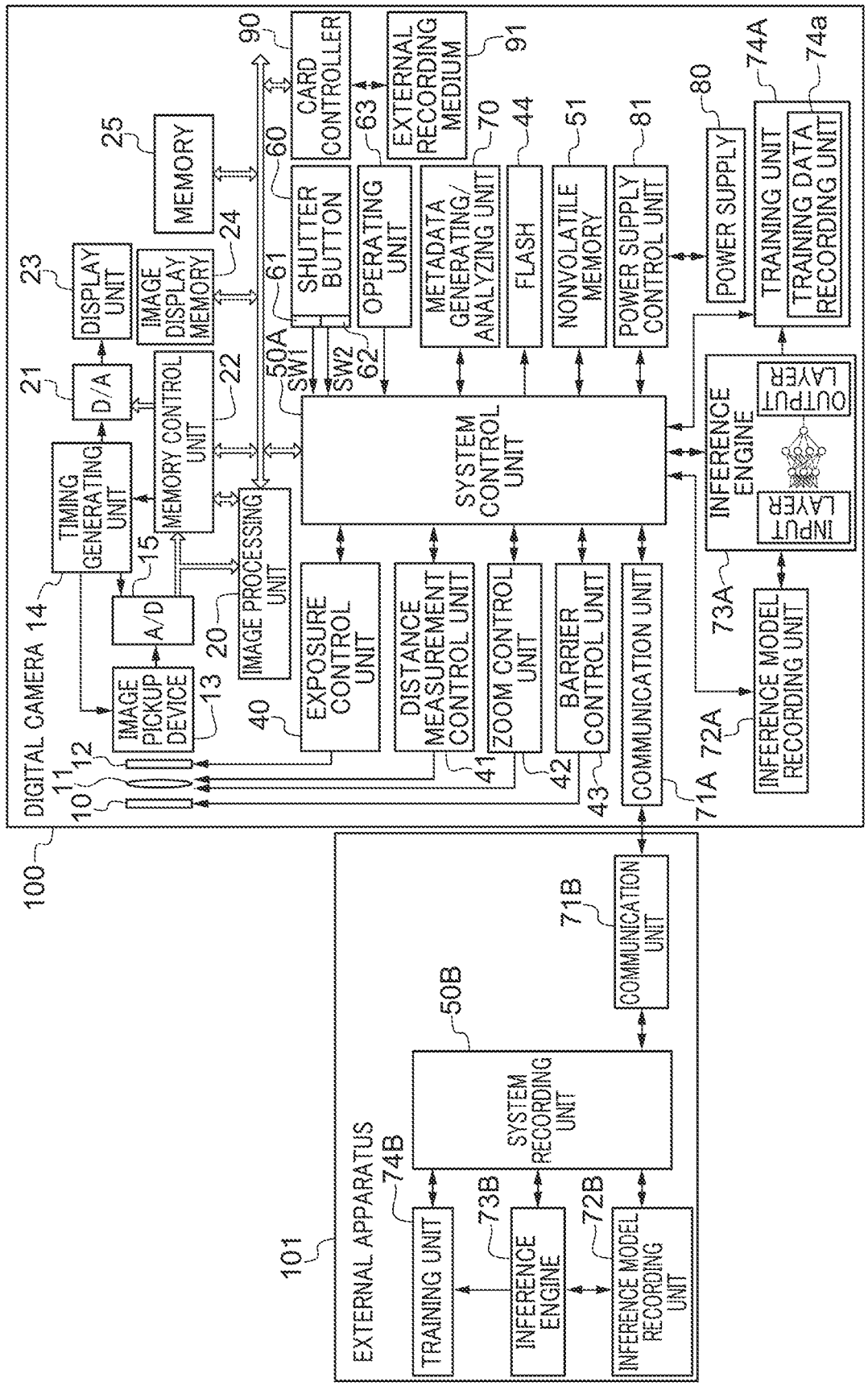
FIG. 1 is a block diagram showing an example of the configuration of a digital camera as an image processing apparatus according to an embodiment of the present invention.

FIG. 1 is a block diagram showing an example of the configuration of the digital camera 100 that is the image processing apparatus according to the present embodiment.

A barrier 10 is a protective member that covers an image pickup unit including a taking lens 11 of the digital camera 100, to protect the image pickup unit from dust and scratches. The taking lens 11 forms an optical image on an imaging surface of an image pickup device 13. A shutter 12 has a diaphragm function. The image pickup device 13 converts an optical image formed on the imaging surface to an electrical signal. The image pickup device 13 is comprised of, for example, a CCD or a CMOS device. An A/D converter 15 (A/D 15) converts analog signals output from the image pickup device 13 to digital signals. The digital signals obtained through the conversion by the A/D converter 15 are written as so-called RAW image data into a memory 25. Development parameters for the respective pieces of the RAW image data are generated based on information obtained during shooting, and the development parameters, as well as the RAW image data, are written into the memory 25. The development parameters include parameters for use in exposure control and parameters for use in image processing, such as white balance, color space, and contrast.

A timing generating unit 14 supplies clock signals and control signals to the image pickup device 13, the A/D converter 15, and a D/A converter 21 (D/A 21). The timing generating unit 14 is controlled by a memory control unit 22 and a system control unit 50A. An image processing unit 20 performs various types of image processing such as predetermined image interpolation, color conversion, correction, and resizing on data output from the A/D converter 15 or on data output from the memory control unit 22. The image processing unit 20 also performs predetermined image processing and arithmetic processing using captured image data and provides the system control unit 50A with obtained calculation results. The system control unit 50A controls, based on the provided calculation results, an exposure control unit 40 and a distance measurement control unit 41 to implement AF (Auto Focus) processing, AE (Auto Exposure) processing, and EF (pre-flashing) processing.

It should be noted that the image processing unit 20 performs predetermined arithmetic processing using captured image data, and performs AWB (Auto White Balance) processing based on an obtained calculation result. The image processing unit 20 also compresses image data stored in the memory 25 using methods such as JPEG, MPEG-4 AVC, or HEVC (High Efficiency Video Coding). The image processing unit 20 also decompresses data that has been compressed using those methods. The image processing unit 20 writes the processed data into the memory 25.

The image processing unit 20 also performs predetermined arithmetic processing using captured image data and edits various types of image data. Specifically, the image processing unit 20 carries out a trimming process that adjusts the size and the display area of an image by hiding an unnecessary part at the edge of image data and a resizing process that changes the size of image data, screen display element, or the like, by enlarging and/or reducing them. The image processing unit 20 also performs, on the compressed or decompressed data, RAW development that performs image processing, such as color conversion and then performs conversion to JPEG image data. The image processing unit 20 also carries out a process that cuts out a designated frame in such a video format as MPEG-4 and converts it to JPEG data.

The image processing unit 20 also carries out, for example, a process that, when displaying OSD (On-Screen Display), such as menus and/or arbitrary characters on the display unit 23 together with image data, superimposes them.

The image processing unit 20 also carries out a process that detects a subject area in image data using input image data and/or information on the distance to a subject obtained from the image pickup device 13, or the like, during shooting. By this process, the position, size, etc., of the subject in the image data are obtained.

The memory control unit 22 controls the A/D converter 15, the timing generating unit 14, the image processing unit 20, an image display memory 24, the D/A converter 21, and the memory 25. RAW image data generated through the A/D converter 15 is written into the image display memory 24 and/or the memory 25 via the image processing unit 20 and the memory control unit 22, or via only the memory control unit 22 without via the image processing unit 20.

Image data to be displayed written into the image display memory 24 is displayed on the display unit 23 via the D/A converter 21. An electronic finder function of displaying live images is implemented by captured image data being successively displayed on the display unit 23. The memory 25 stores still image data and video data that have been shot. The memory 25 has a storage capacity enough to store a predetermined number of still image data and/or predetermined hours of video data. The memory 25 is also used as a work area for the system control unit 50A.

The exposure control unit 40 controls the shutter 12 having the diaphragm function. The exposure control unit 40 also implements a flash light modulation function by operating in conjunction with a flash 44. The distance measurement control unit 41 controls the focusing of the taking lens 11. A zoom control unit 42 controls the zooming of the taking lens 11. A barrier control unit 43 controls the operation of the barrier 10, which is the protective member. The flash 44 has an AF assist light projecting function and a flash light modulation function.

The system control unit 50A controls the entire digital camera 100. A nonvolatile memory 51 is capable of electrically erasing and recording data. For example, an EEPROM is used as the nonvolatile memory 51. It should be noted that map information, or the like, as well as programs, is recorded on the nonvolatile memory 51.

When the shutter button 60 is pressed halfway down, a shutter switch 61 (SW1) is turned on to issue an instruction to start AF processing, AE processing, AWB processing, EF processing, or the like. When the shutter button 60 is pressed all the way down, a shutter switch 62 (SW2) is turned on to issue an instruction to start a sequence of shooting operations, including an exposure process, a development process, and a recording process. In the exposure process, a signal read out from the image pickup device 13 is written as RAW data into the memory 25 via the A/D converter 15 and the memory control unit 22. In the development process, the RAW data written into the memory 25 is developed using the results of calculation by the image processing unit 20 and the memory control unit 22, and written as image data into the memory 25. In the recording process, the image data is read out from the memory 25 and compressed by the image processing unit 20 and stored in the memory 25. And then, the compressed image data is written into an external recording medium 91 via a card controller 90.

An operating unit 63 is equipped with various types of buttons, a touch panel, and so forth. For example, the operating unit 63 includes a power button, a menu button, a mode changing switch for changing a shooting mode among a shooting mode/a playback mode/other special shooting modes, and a cross key, a set button, a macro button, and a multi-screen reproducing page-break button. The operating unit 63 also includes, for example, a flash setting button, a single shooting/continuous shooting/self-timer selection button, a menu move plus (+) button, a menu move minus (−) button, a shooting image quality selection button, an exposure compensation button, a date/time setting button, and so forth.

A metadata generating/analyzing unit 70, when recording image data in the external recording medium 91, generates metadata conforming to the Exif (Exchangeable image file format) standard, or the like, for image data based on information obtained during shooting. The metadata includes, for example, information on settings in shooting, information on the image data, and characteristic information on a subject included in the image data. The metadata generating/analyzing unit 70 analyzes metadata added to image data loaded from the external recording medium 91. The metadata generating/analyzing unit 70 is also capable of generating metadata for respective frames and adding to the metadata of all the frames to video data, when recording image data.

A power supply 80 is comprised of a primary battery, such as an alkali battery or a lithium battery, a secondary battery such as a NiCd battery, a NiMH battery, or a Li battery, an AC adapter, and so forth. The power supply control unit 81 supplies power supplied from the power supply 80 to each component of the digital camera 100. The card controller 90 sends and receives data to and from the external recording medium 91, such as a memory card. The external recording medium 91 is comprised of, for example, a memory card and records image data (still image data, video data) shot by the digital camera 100.

An inference model recording unit 72A stores an inference model obtained from an external apparatus 101, or the like, by a communication unit 71A. An inference engine 73A inputs an image file, which includes image data and annotation information on the image data and is obtained from the system control unit 50A, to the inference model stored in the inference model recording unit 72A, and performs inference. It should be noted that, in the present embodiment, the inference engine 73A can use an inference model obtained from the external apparatus 101, or the like, by the communication unit 71A and recorded in the inference model recording unit 72A or use an inference model obtained by a training unit 74A retraining.

The inference model is comprised of an input layer, an intermediate layer (neurons), and an output layer. An image file output from the system control unit 50A is input to the input layer. The intermediate layer is comprised of a plurality of layers. The number of layers in the intermediate layer is determined appropriately for design, and the number of neurons in each layer is also determined appropriately for design. The output layer outputs annotation information for the image file input to the input layer.

In the present embodiment, it is assumed that the inference model used by the inference engine 73A is an inference model that infers the classification of a subject area detected from image data. This inference model is generated in the external apparatus 101, or the like, by deep learning using, as training data, image data on various subjects and its classification result (e.g., the classification of animals such as dogs and cats and the classification of subjects such as humans, animals, plants, and buildings). It should be noted that the digital camera 100 can obtain an inference model other than the above inference model from the external apparatus 101, or the like, and use the obtained another inference model.

The training unit 74A retrains the inference model stored in the inference model recording unit 72A (namely, updates the inference model) in accordance with an instruction from the system control unit 50A. The training unit 74A has a training data recording unit 74a. The training data recording unit 74a records information on training data for use in retraining the inference model. The training unit 74A retrains the inference model using the training data recorded in the training data recording unit 74a and stores the retrained inference model in the inference model recording unit 72A. As a result, the inference engine 73A can perform inference using the retrained inference model. It should be noted that, in the present embodiment, a management version for managing the update status of the inference model can be held in the inference model recording unit 72A, making it possible to know the update status of the inference model based on the management version.

The communication unit 71A has a communication circuit for sending and receiving data. Communication by the communication unit 71A can be either wireless communication using Wi-Fi (registered trademark), Bluetooth (registered trademark), or the like, or wired communication using Ethernet, USB, or the like. For example, the communication unit 71A is capable of communicating with a communication unit 71B of the external apparatus 101. The communication unit 71A functions as a communication unit that sends and receives various types of information, such as inference models and training data as well as image files, to which annotation information created by the inference engine 73A is added. It should be noted that, based on whether or not the external apparatus 101 is a camera-related apparatus, the digital camera 100 can place a limit on information to be sent.

The external apparatus 101 has a training unit 74B, an inference engine 73B, an inference model recording unit 72B, a system recording unit 50B, and the communication unit 71B. The training unit 74B creates an inference model in accordance with an instruction received from the system recording unit 50B, or the like. The inference model recording unit 72B records an inference model sent from the digital camera 100 and an inference model created by the training unit 74B.

In the present embodiment, the digital camera 100 detects a target, such as a person, an animal, a plant, a building, or an object from image data obtained by shooting. The digital camera 100 then generates an image file, including the image data obtained by shooting and annotation information on the image data. The digital camera 100 records, for example, information indicating the area of the detected target by a point, a rectangle, a circle, or the like, as the annotation information, in the image file. The digital camera 100 also cuts out the image data of the detected target as image data (related image data) related to original image data and records the cut-out image data (related image data) in the image file. The digital camera 100 also records, in the image file, the properties of the cut-out image data such as color, shape, and type. In the present embodiment, for example, when receiving an instruction to shoot HEIF image data from a user, the digital camera 100 generates an HEIF image file 200 shown in FIG. 2A.

Figure 2A:
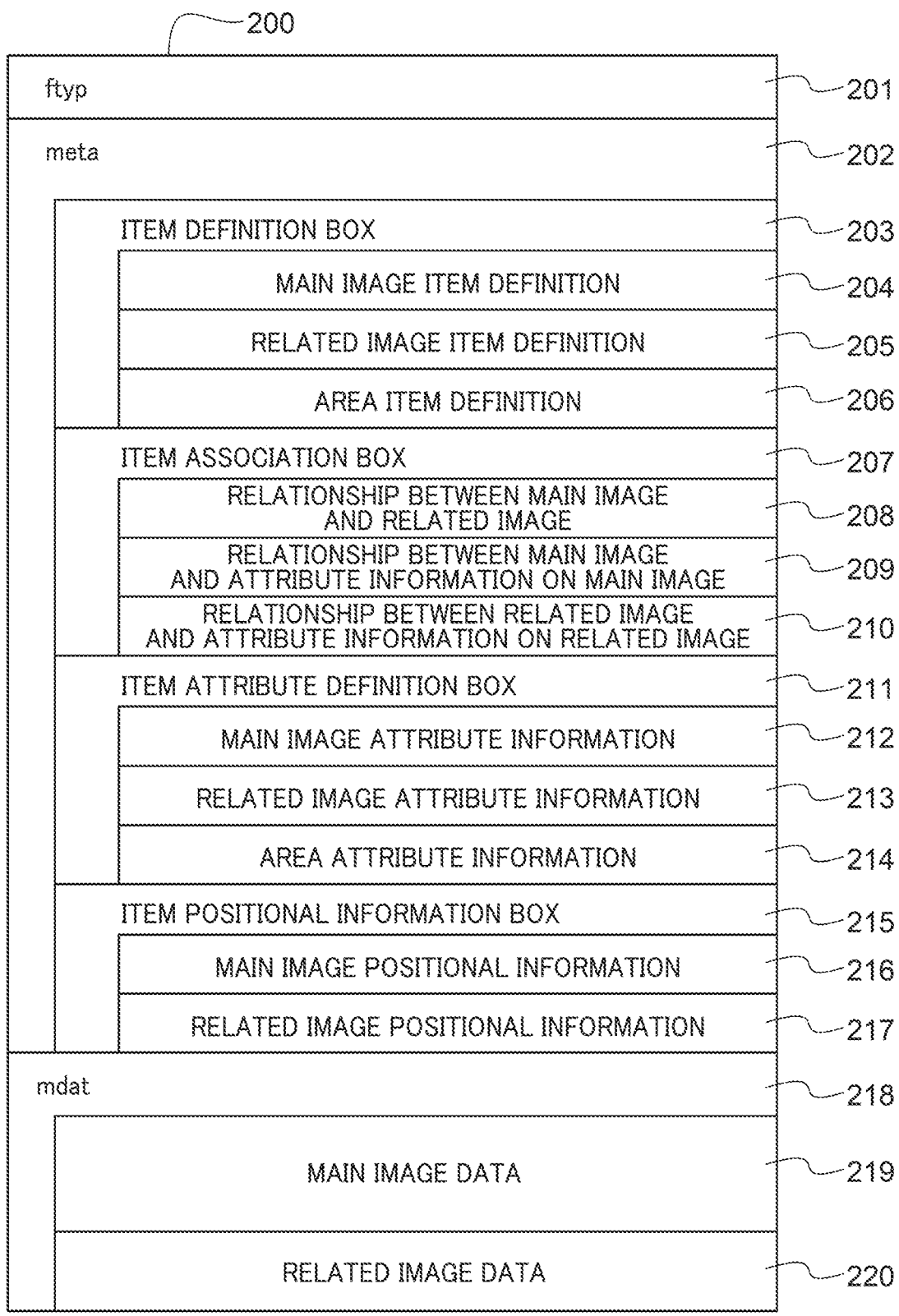
FIGS. 2A to 2D are views useful in explaining the configuration of an HEIF image file that is used in the embodiment of the present invention.
Figure 2B:
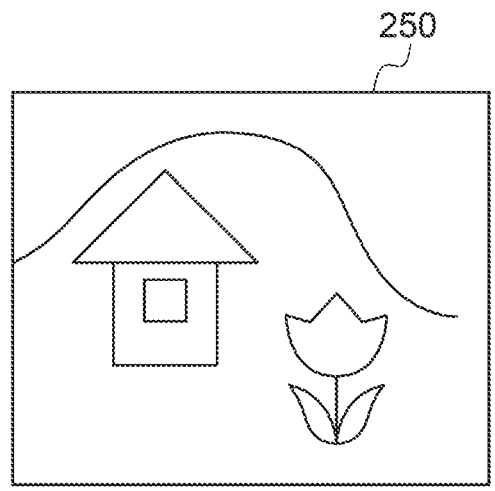
Figure 2C:
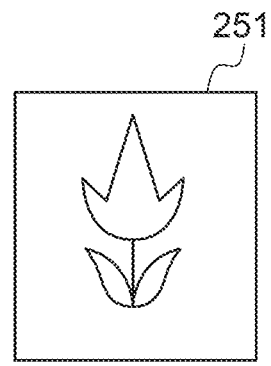

FIGS. 2A to 2D are views useful in explaining the configuration of the HEIF image file 200 that is used in the embodiment of the present invention. As shown in FIG. 2A, the HEIF image file 200 is comprised of a plurality of areas each called as "box" and records data in a tree structure. Data can be directly recorded in the boxes, or in a certain box, other boxes can be recorded as child elements. The HEIF image file 200 has an ftype box 201, in which the type of an image file is recorded, a meta box 202, in which metadata including annotation information and others is recorded, and an mdat box 218, in which image data is recorded. It should be noted that FIG. 2A illustrates the minimum boxes necessary to the explanation of the present invention, but the HEIF image file 200 may have other boxes in addition to the above-mentioned boxes.

The meta box 202 has an item definition box 203, an item association box 207, an item attribute definition box 211, and an item positional information box 215, as child elements.

In the item definition box 203, items desired to be defined as annotation information are recorded as child elements. In the item definition box 203 in FIG. 2A, a main image item definition 204, a related image item definition 205, and an area item definition 206 are recorded. To define another annotation information, an item desired to be defined is added to the item definition box 203. A definition of an item number of image data 250 (FIG. 2B), which is main image data in the HEIF image file 200, a definition of an item type as "Image", and so forth are recorded in the main image item definition 204. A definition of an item number of related image data 251 (FIG. 2C) cut out from the image data 250, a definition of an item type as "Image", and so forth are recorded in the related image item definition 205. A definition of an item number for an area corresponding to the related image data 251 in the image data 250, for example, an area 253 (FIG. 2D) and a definition of an item type as "Area" are recorded in the area item definition 206.

Item reference information is recorded as child elements in the item association box 207. In FIG. 2A, the relationship between a main image and a related image 208, the relationship between the main image and attribute information on the main image 209, and the relationship between the related image and the attribute information on the related image 210 are recorded in the item association box 207. It should be noted that, to define another annotation information, an item desired to be defined is added to the item association box 207. In the relationship between the main image and the related image 208, the item number of the main image data and the item number of the related image data are recorded in association with each other. In the relationship between the main image and the attribute information on the main image 209, the item number of the main image data and attribute information on the main image data 212 (described below) are recorded in association with each other. In the relationship between the related image and attribute information on the related image 210, the item number of the related image data and attribute information on the related image 213 (described below) are recorded in association with each other.

Figure 2D:
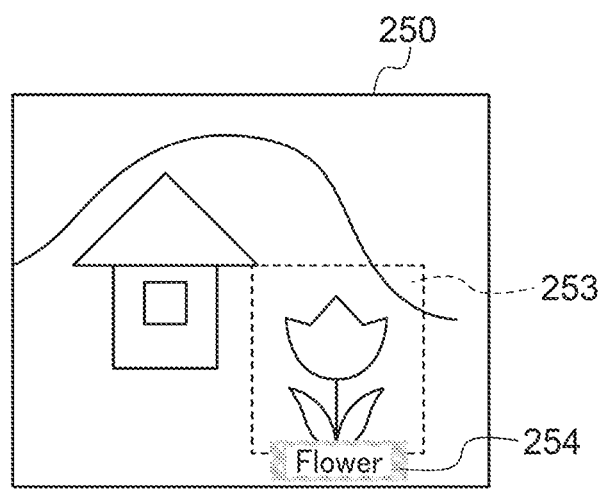

In the item attribute definition box 211, properties such as item attribute information, are recorded as child elements. In FIG. 2A, main image attribute information 212, related image attribute information 213, and area attribute information 214 are recorded in the item attribute definition box 211. It should be noted that, to define another annotation information, an item desired to be defined is added to the item attribute definition box 211. Size information, color space information, pixel information, rotational information, and so forth, on the main image data are recorded in the main image attribute information 212. Size information, color space information, pixel information, rotational information, and so forth, on the related image data are recorded in the related image attribute information 213. The attribute of a detected target is also recorded in the related image attribute information 213. By recording the attribute of the detected target in the related image attribute information 213, for example, as shown in FIG. 2D, a character string 254 "Flower" indicating the attribute of the related image can be displayed in the area 253 corresponding to the related image data. The shape, coordinates, and the like, of the area of the detected target are recorded in the area attribute information 214.

In the item positional information box 215, positional information on the image data in the mdat box 218 is recorded as child elements. In FIG. 2A, main image positional information 216 and related image positional information 217 are recorded in the item positional information box 215. The positional information on the main image data in the mdat box 218 is recorded in the main image positional information 216. The positional information on the related image data in the mdat box 218 is recorded in the related image positional information 217. Main image data 219 and related image data 220 related to the main image data 219 are recorded in the mdat box 218. It should be noted that, image data in formats other than HEIF, can be recorded in the mdat box 218.

Figure 3:
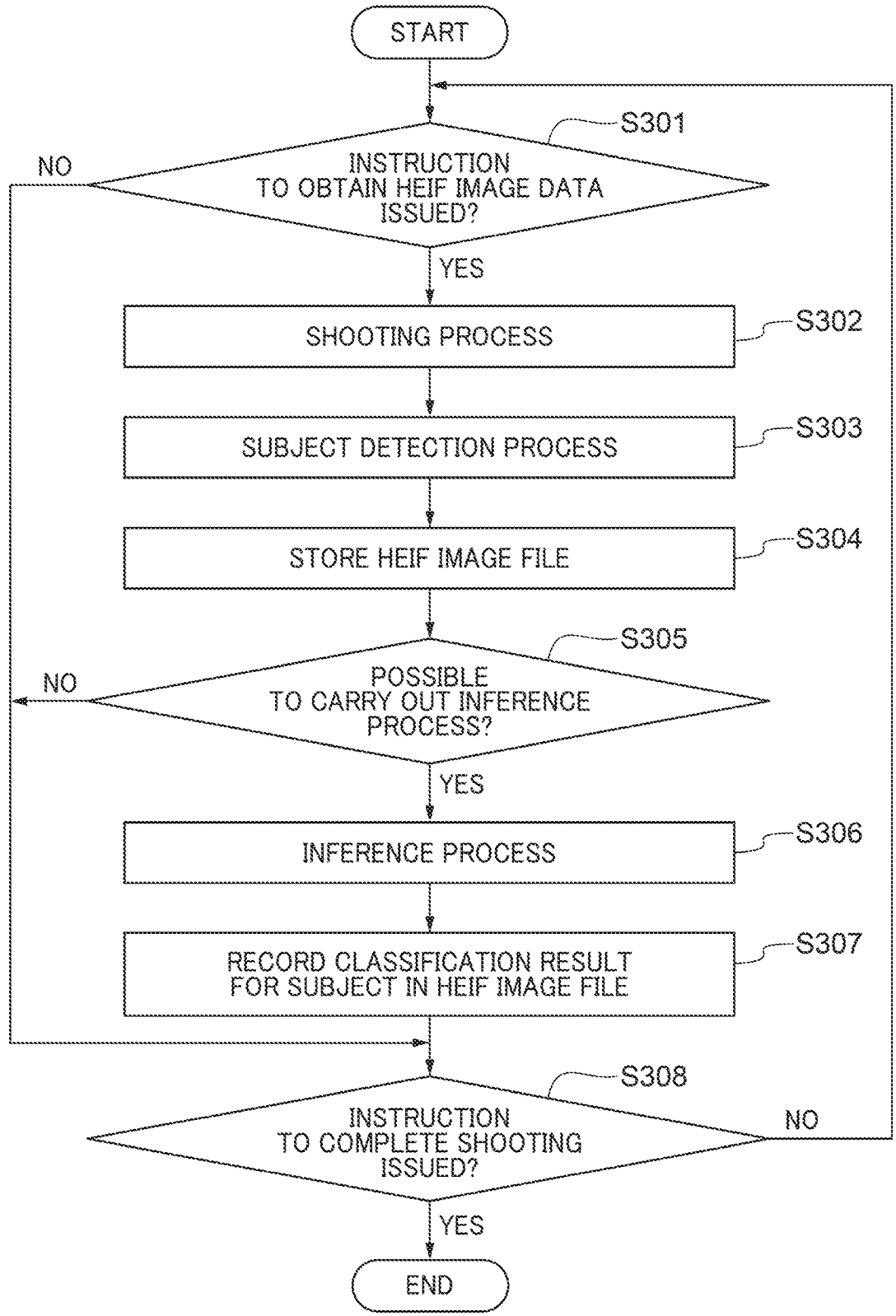
FIG. 3 is a flowchart showing the procedure of a shooting control process that is carried out by the digital camera in FIG. 1.

Shooting performed by the digital camera 100 is now described below. FIG. 3 is a flowchart showing the procedure of a shooting control process that is carried out by the digital camera 100 in FIG. 1. The shooting control process in FIG. 3A is implemented by the system control unit 50A executing a program stored in the nonvolatile memory 51 or the like. The shooting control process in FIG. 3 is carried out when the user has selected the shooting mode with the mode changing switch included in the operating unit 63.

First, the system control unit 50A determines whether or not the user has issued an instruction to obtain HEIF image data by depressing the shutter switch 61 (SW1) or the shutter switch 62 (SW2) (step S301). In a case when it is determined in the step S301 that the user has issued an instruction to obtain HEIF image data, the process proceeds to step S302. In a case when it is determined in the step S301 that the user has not issued an instruction to obtain HEIF image data, the process proceeds to step S308 (described later).

In the step S302, the system control unit 50A carries out a shooting process. In the shooting process, the system control unit 50A performs AF processing and AE processing by controlling the distance measurement control unit 41 and the exposure control unit 40, and stores picture data (still image data, or video data) output from the image pickup device 13 in the memory 25. The system control unit 50A also controls the image processing unit 20 to compress the picture data (still image data, or video data), which is stored in the memory 25, to generate (obtain) HEIF image data.

Next, in step S303, the system control unit 50A controls the image processing unit 20 to carry out a subject detection process on the picture data (still image data, or video data) stored in the memory 25. As a result, a subject area in the picture data (still image data, or video data) is detected.

Then, in step S304, the system control unit 50A stores the HEIF image file 200, which includes the image data generated in the step S302 and information on the subject area detected in the step S303, in the external recording medium 91. The information on the subject area is recorded as information for use in an inference process (described later), in the meta box 202 of the HEIF image file 200, by metadata generating/analyzing unit 70.

After that, in step S305, the system control unit 50A determines whether or not it is possible to carry out the inference process by the inference engine 73A. For example, it is determined that it is not possible to carry out the inference process using the inference engine 73A in a case when at least one of the following two conditions applies: the condition that the inference engine 73A is currently processing another image file, and the condition that the user is currently issuing an instruction to perform continuous shooting by keeping depressing the shutter switch 62. In a case when neither of the above two conditions applies, it is determined that it is possible to carry out the inference process using the inference engine 73A. In a case when it is determined that it is not possible to carry out the inference process using the inference engine 73A, the process proceeds to the step S308 (described later). On the other hand, in a case when it is determined that it is possible to carry out the inference process using the inference engine 73A, the process proceeds to step S306.

In the step S306, the system control unit 50A subjects the HEIF image file 200 to the inference process using the inference engine 73A. The inference engine 73A carries out the inference process for the HEIF image file 200 as an input, using an inference model recorded in the inference model recording unit 72A. In this inference process, subject areas in image data are identified from image data and annotation information included in the HEIF image file 200, and the results of classification for subjects corresponding to the subject areas are output as inference results for each subject area. It should be noted that, information relating to the inference processn such as debug information and logs of operations during the inference processn can be output as alternatives to the inference results or in addition to the inference results.

Then, in step S307, the system control unit 50A records the classification results for the subjects obtained in the step S306 as annotation information in the HEIF image file 200. It should be noted that in the HEIF image file 200, the results of classification for the subjects, which are output as the inference results from the inference model, have only to be recorded as annotation information. Namely, the results of classification for the subjects can be recorded as they are in the HEIF image file 200, and the results of classification for the subjects (annotation information) can be recorded in any recording format, such as text format and binary format. It is easier to manage data in a case when the image data and the results of classification for the subjects are recorded in the HEIF image file 200 in this way, than in a case when data is individually recorded. The system control unit 50A also records the management version of the inference model held in the inference model recording unit 72A, debug information for the inference model, and so forth as inference model management information, in the HEIF image file 200.

Then, in the step S308, the system control unit 50A determines whether or not an instruction to complete shooting has been received from the user. The user is able to issue the instruction to complete shooting by, for example, setting a mode other than the shooting mode with the mode changing switch in the operating unit 63 or by setting the power to OFF with the power button. In a case where it is determined in the step S308 that the instruction to complete shooting has not been received from the user, the process returns to the step S301. In a case where it is determined in the step S308 that the instruction to complete shooting has been received from the user, the present process is ended.

As described above, in the present embodiment, the HEIF image file 200 including image data generated by the digital camera 100 shooting subjects and annotation information such as the results of classification for the subjects is generated.

Moreover, the digital camera 100 according to the present embodiment is also capable of generating a JPEG image file, and, for example, is capable of converting the above-mentioned HEIF image file 200 into a JPEG image file.

The memory capacity of an annotation information recording space in a JPEG image file is less than that of an image file in another format, such as HEIF. For this reason, in a case when an image file in HEIF or the like (pre-conversion image file) is converted into a JPEG image file (post-conversion image file), all of annotation information recorded in the pre-conversion image file cannot be recorded in the JPEG image file. As a result, a part of the annotation information recorded in the pre-conversion image file cannot be used in the post-conversion image file.

On the other hand, in the present embodiment, in a case when the annotation information included in the HEIF image file is not predetermined annotation information, whose data amount is equal to or greater than the predetermined value, the annotation information is recorded in an application marker, which will be described later. In a case when the annotation information included in the HEIF image file is the predetermined annotation information, link information on the annotation information is recorded in the application marker, which will be described later.

Figure 4:
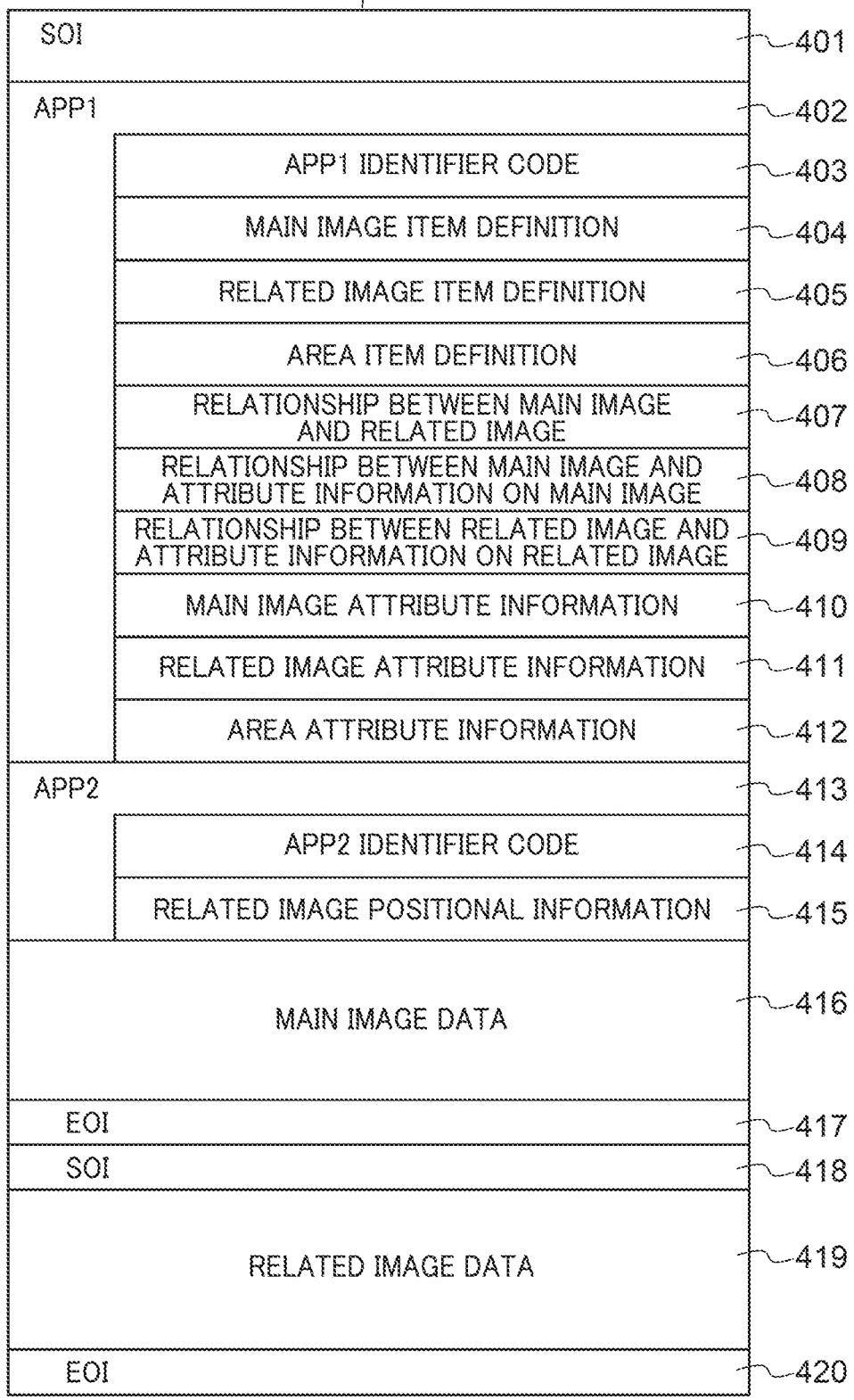
FIG. 4 is a view useful in explaining the configuration of a JPEG image file that is used in the embodiment of the present invention.

FIG. 4 is a view useful in explaining the configuration of a JPEG image file 400 that is used in the embodiment of the present invention. As shown in FIG. 4, in the JPEG image file 400, a marker SOI 401 indicating the start of an image file is recorded at the head of the JPEG image file 400, and an application marker (denoted by "APP1" in FIG. 4) 402 is recorded on a row subsequent to the marker SOI 401.

The application marker 402 is an area where annotation information or the like is recorded, and has memory capacity less than that of the meta box 202 in the HEIF image file 200. An APP1 identifier code 403 is recorded in the application marker 402. Typical examples of the APP1 identifier code 403 include Exif. Various types of metadata are recorded in the application marker 402. Specifically, a main image item definition 404, a related image item definition 405, an area item definition 406, the relationship between a main image and a related image 407, and the relationship between the main image and attribute information on the main image 408 are recorded in the application marker 402. The relationship between the related image and the attribute information on the related image 409, main image attribute information 410, related image attribute information 411, and area attribute information 412 are also recorded in the application marker 402.

Information similar to the information in the above-described main image item definition 204 is recorded in the main image item definition 404. Information similar to the information in the above-described related image item definition 205 is recorded in the related image item definition 405. Information similar to the information in the above-described area item definition 206 is recorded in the area item definition 406. Information similar to the information in the above-described relationship between the main image and the related image 208 is recorded in the relationship between the main image and the related image 407. Information similar to the information in the above-described relationship between the main image and the attribute information on the main image 209 is recorded in the relationship between the main image and the attribute information on the main image 408. Information similar to the information in the above-described relationship between the related image and the attribute information on the related image 210 is recorded in the relationship between the related image and the attribute information on the related image 409. Information similar to the information in the above-described main image attribute information 212 is recorded in the main image attribute information 410. Information similar to the information in the above-described related image attribute information 213 is recorded in the related image attribute information 411. Information similar to the information in the above-described area attribute information 214 is recorded in the area attribute information 412.

An application marker (denoted by "APP2" in FIG. 4) 413 is recorded on a row subsequent to the area attribute information 412. As with the application marker 402, the application marker 413 is an area where annotation information, or the like, is recorded, and has a memory capacity less than that of the meta box 202 in the HEIF image file 200. An APP2 identifier code 414 is recorded in the application marker 413. Link information on related image data is recorded as metadata in the application marker 413. Specifically, related image positional information 415 is recorded in the application marker 413. The size of related image data 419 (described later), and the location of a marker SOI 418 indicating the start of the related image data 419 are recorded in the related image positional information 415.

Main image data 416 is recorded in a row subsequent to the related image positional information 415. The main image data 416 is main image data in the JPEG image file 400. A marker EOI 417 indicating the end of main image data is recorded in a row subsequent to the main image data 416. A marker SOI 418 indicating the start of related image data, and the related image data 419, are recorded in this order in rows subsequent to the marker EOI 417. A marker EOI 420 indicating the end of related image data is recorded on a row subsequent to the related image data 419.

Figure 5A:
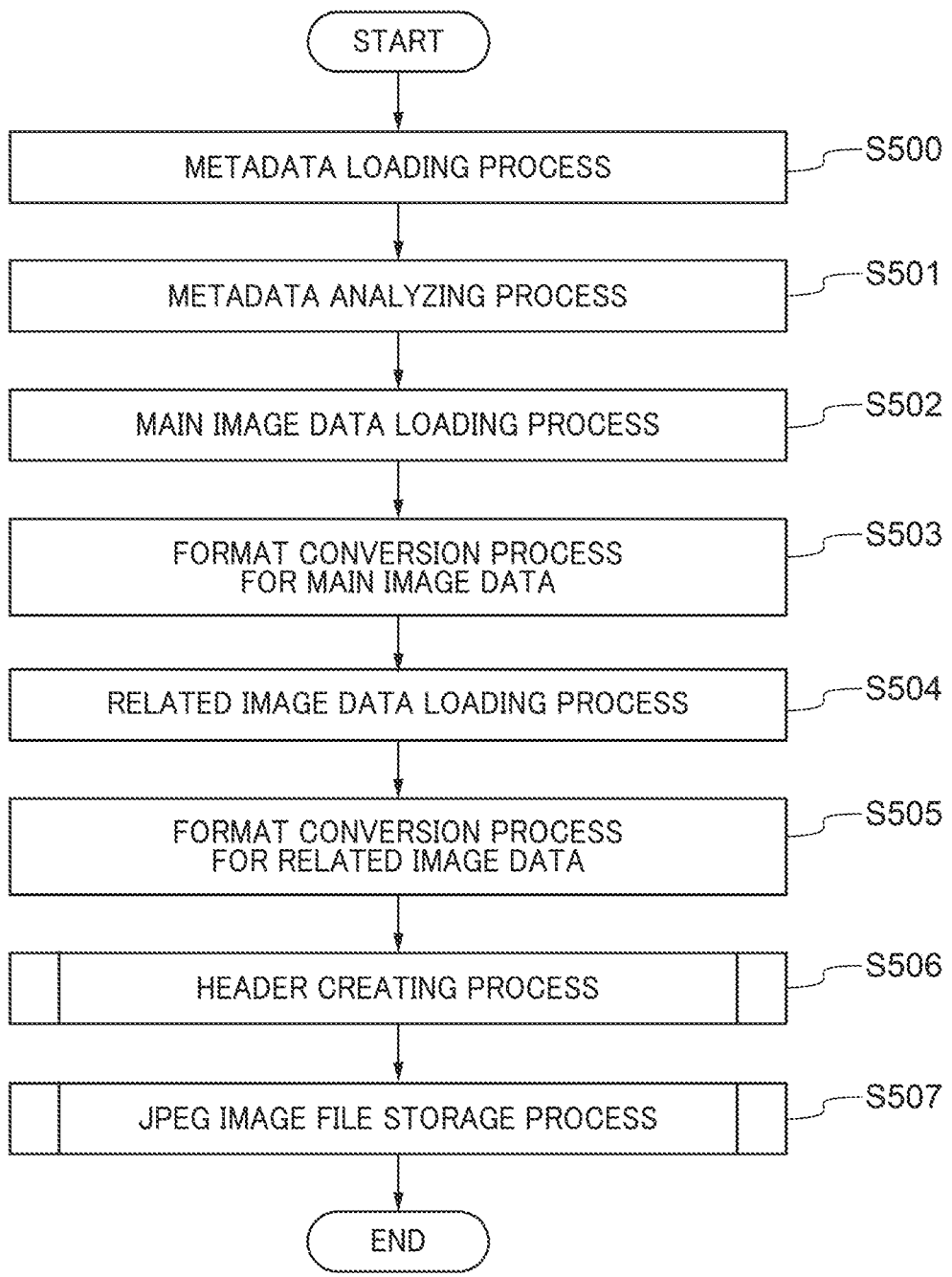
FIG. 5A is a flowchart showing the procedure of a format conversion process that is carried out in the digital camera in FIG. 1.

FIG. 5A is a flowchart showing the procedure of a format conversion process that is carried out in the digital camera 100 in FIG. 1. The format conversion process in FIG. 5A is implemented by the system control unit 50A executing a program stored in the nonvolatile memory 51, or the like. The format conversion process in FIG. 5A is carried out when the digital camera 100 has received an image conversion instruction from the user via the operating unit 63. The user selects at least one image file to be processed from a plurality of image files stored in the external recording medium 91 and issues an image conversion instruction. Referring to FIG. 5A, a case, as an example, in which the user selects one HEIF image file and issues an image conversion instruction to convert the selected HEIF image file to a JPEG image file, is described.

First, in step S500, the system control unit 50A carries out a metadata loading process to load metadata from the HEIF image file selected by the user. Specifically, the system control unit 50A reads information recorded in each of the ftype box 201 and the meta box 202 in the HEIF image file, and writes the read information into the memory 25.

Next, in step S501, the system control unit 50A carries out a metadata analyzing process to analyze the metadata for the HEIF image file. In the metadata analyzing process, the system control unit 50A analyzes the information in the ftype box 201 and the information in the meta box 202 written into the memory 25 in the step S500, and extracts the metadata recorded in the HEIF image file. As a result of the metadata analyzing process, the main image positional information 216 and the related image positional information 217 recorded in the HEIF image file are obtained.

Then, in step S502, the system control unit 50A carries out a main image data loading process to load main image data recorded in the HEIF image file. Specifically, the system control unit 50A reads the main image data 219 from the HEIF image file using the main image positional information 216 obtained by the metadata analyzing process and writes the read main image data 219 into the memory 25.

After that, in step S503, the system control unit 50A carries out a format conversion process for the main image data 219. Specifically, the system control unit 50A decodes the main image data 219 written into the memory 25 in the step S502. The system control unit 50A also encodes the decoded main image data 219 into the main image data 416 to be recorded in the JPEG image file, using a conversion engine (not shown).

Then, in step S504, the system control unit 50A carries out a related image data loading process to load related image data recorded in the HEIF image file. Specifically, the system control unit 50A reads the related image data 220 from the HEIF image file using the related image positional information 217 obtained by the metadata analyzing process and writes the read related image data 220 into the memory 25.

After that, in step S505, the system control unit 50A carries out a format conversion process for the related image data 220. Specifically, the system control unit 50A decodes the related image data 220 written into the memory 25 in the step S504. The system control unit 50A also encodes the decoded related image data 220 into the related image data

419 to be recorded in the JPEG image file, using the conversion engine (not shown).

Then, in step S506, the system control unit 50A carries out a header creating process in FIG. 5B, to be described later, to create a header of the JPEG image file, which is a post-conversion image file. After that, in step S507, the system control unit 50A carries out a JPEG image file storage process in FIG. 5C to be described later, to store the JPEG image file created by conversion from the HEIF image file, in the external recording medium 91 and ends the present process.

Figure 5B:
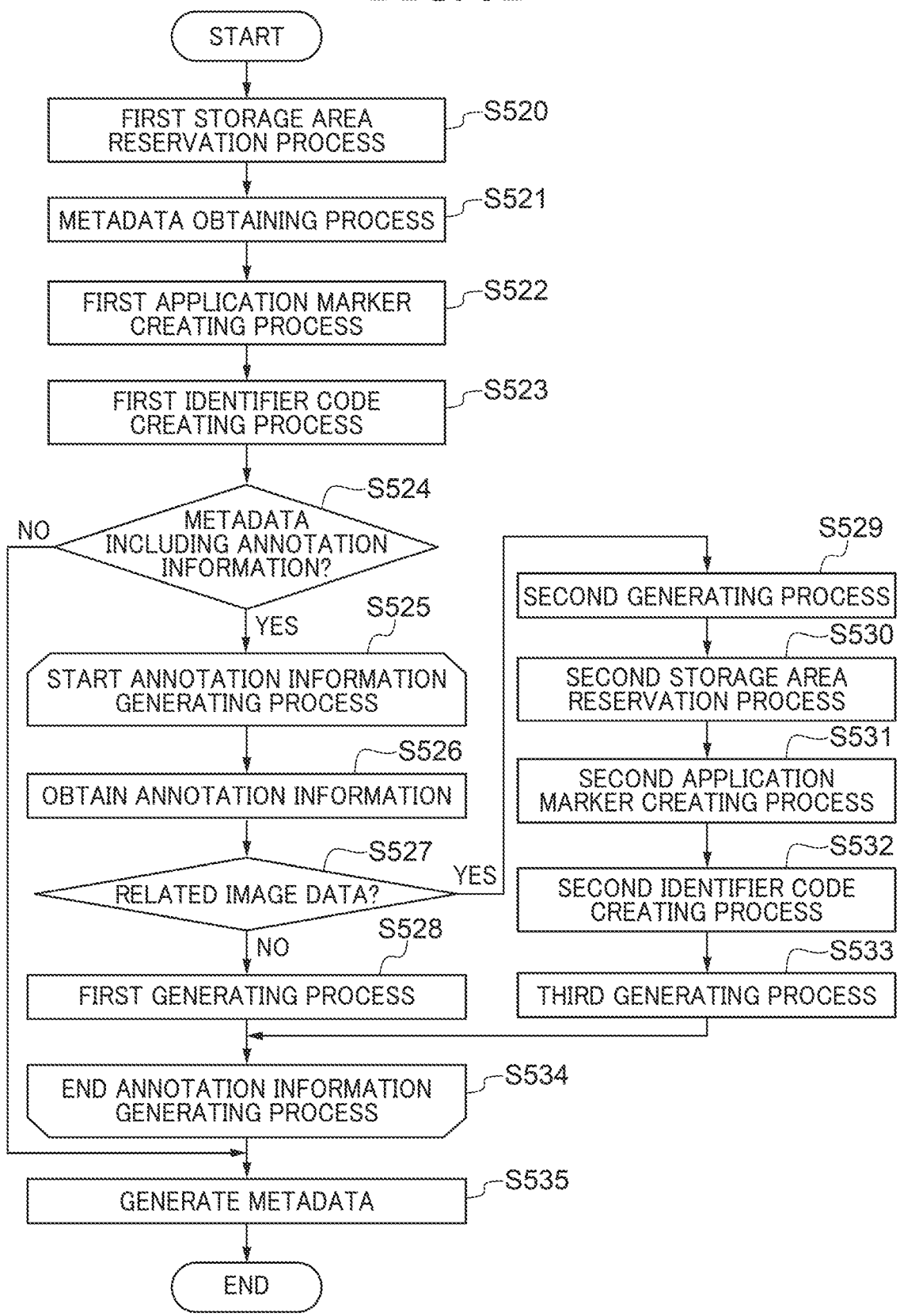
FIG. 5B is a flowchart showing the procedure of a header creating process in step S506 in FIG. 5A.

FIG. 5B is a flowchart showing the procedure of the header creating process in the step S506 in FIG. 5A.

Referring to FIG. 5B, in step S520, the system control unit 50A carries out a first storage area reservation process. As a result of the first storage area reservation process, a first storage area for use in creating the header of the JPEG image file, which is the post-conversion image file, is reserved in the memory 25.

In step S521, the system control unit 50A carries out a metadata obtaining process to obtain metadata for the HEIF image file. Specifically, the system control unit 50A reads out the information in the ftype box 201 and the information in the meta box 202 written in the memory 25 in the step S500, from the memory 25.

Then, in step S522, the system control unit 50A carries out a first application marker creating process. As a result of the first application marker creating process, the application marker 402 in the JPEG image file is created. Here, APP1 is created as an example of the application marker 402. It should be noted that the application marker 402 to be created in the step S522 is not limited to APP1, but another application marker corresponding to an identifier code created in step S523 to be described later, can be created.

After that, in the step S523, the system control unit 50A carries out a first identifier code creating process. As a result of the first identifier code creating process, an APP1 identifier code 403 (an identifier code for APP1) in the JPEG image file is created. Here, Exif is created as an example of the APP1 identifier code 403. It should be noted that the APP1 identifier code 403 to be created in the step S523 is not limited to Exif, but another identifier code can be created.

Then, in step S524, the system control unit 50A determines whether or not the metadata obtained in the step S521 includes annotation information. In a case when it is determined, in the step S524, that the metadata obtained, in the step S521, includes annotation information, the process proceeds to step S525. In a case when it is determined in the step S524 that the metadata obtained in the step S521 includes no annotation information, the process proceeds to step S535 to be described later.

In the step S525, the system control unit 50A starts an annotation information generating process to generate annotation information to be recorded in the JPEG image file. In the annotation information generating process, processes in steps S526 to S533 are carried out. The annotation information generating process is carried out for all the annotation information recorded in the HEIF image file.

In the step S526, the system control unit 50A obtains annotation information from the metadata obtained in the step S521. Then, in the step S527, the system control unit 50A determines whether or not the obtained annotation information is the predetermined annotation information whose data amount is equal to or greater than the predetermined value. Specifically, the system control unit 50A determines whether or not the obtained annotation information is the related image data. More specifically, based on, for example, the information in the item definition box 203, in the metadata obtained in the step S521, the system control unit 50A determines whether or not the obtained annotation information is the related image data.

In a case when it is determined in the step S527 that the obtained annotation information is not the related image data, the process proceeds to the step S528. In the step S528, the system control unit 50A carries out a first generating process. In the first generating process, the obtained annotation information, that is, the annotation information, which is not the related image data, is generated as it is (without being processed), as annotation information to be recorded in the JPEG image file 400. For example, in a case when the obtained annotation information is the area attribute information 214, the system control unit 50A stores the area attribute information 214 as it is (without processing) in the first storage area. This annotation information is recorded as the area attribute information 214, in the application marker 402 in the JPEG image file 400, by the JPEG image file storage process in FIG. 5C, which will be described later. Thus, in the present embodiment, annotation information other than the predetermined annotation information, whose data amount is equal to or greater than the predetermined value, out of the annotation information in the HEIF image file, is recorded as it is (without being processed) in the application marker in the JPEG image file. The process then proceeds to step S534 described later.

In a case when it is determined in the step S527 that the obtained annotation information is the related image data, the process proceeds to the step S529. In the step S529, the system control unit 50A carries out a second generating process. In the second generating process, annotation information that is annotation information to be recorded in the application marker 402 in the JPEG image file and is related to the related image data is generated. For example, annotation information corresponding to the relationship between the related image and the attribute information on the related image 409, and annotation information corresponding to the related image attribute information 411, are generated. The generated annotation information is stored in the first storage area reserved in the step S520.

Then, in the step S530, the system control unit 50A carries out a second storage area reservation process. As a result of the second storage area reservation process, a second storage area different from the first storage area is reserved in the memory 25. The second storage area is a storage area for use in creating annotation information to be recorded in the application marker 413 in the JPEG image file.

Then, in the step S531, the system control unit 50A carries out a second application marker creating process. As a result of the second application marker creating process, the application marker 413 in the JPEG image file is created. Here, APP2 is created as an example of the application marker 413. It should be noted that the application marker 413 to be created in the step S531 is not limited to APP2, but another application marker, corresponding to an identifier code created in the step S532 described later, can be created.

After that, in the step S532, the system control unit 50A carries out a second identifier code creating process. As a result of the second identifier code creating process, the APP2 identifier code 414 (an identifier code for APP2) in the JPEG image file is created.

Then, in the step S533, the system control unit 50A carries out a third generating process. In the third generating process, link information on the related image data to be recorded in the application marker 413 in the JPEG image file is generated. For example, link information corresponding to the related image positional information 415 is generated. The generated link information on the related image data is stored in the second storage area reserved in the step S530. The various types of information generated in the step S529 and S533 are recorded in the application markers 402 and 413 in the JPEG image file by the JPEG image file storage process in FIG. 5C described later. Thus, in the present embodiment, the predetermined annotation information, whose data amount is equal to or greater than the predetermined value, out of the annotation information in the HEIF image file, is not recorded in the application markers in the JPEG image file, but link information on the annotation information is recorded. It should be noted that, in a case when positional information on the related image data is determined in the JPEG image file storage process in FIG. 5C described later, the link information corresponding to the related image positional information 415 can be updated at a timing when the positional information is determined. The process then proceeds to the step S534.

Upon completing the processing on all the annotation information recorded in the HEIF image file, the system control unit 50A ends the annotation information generating process in the step S534.

Then, in the step S535, the system control unit 50A generates metadata other than annotation information. For example, in a case when the APP1 identifier code 403 is Exif, the system control unit 50A generates, in the step S535, metadata such as the date and time of shooting and shooting conditions. After that, the present process is ended.

Figure 5C:
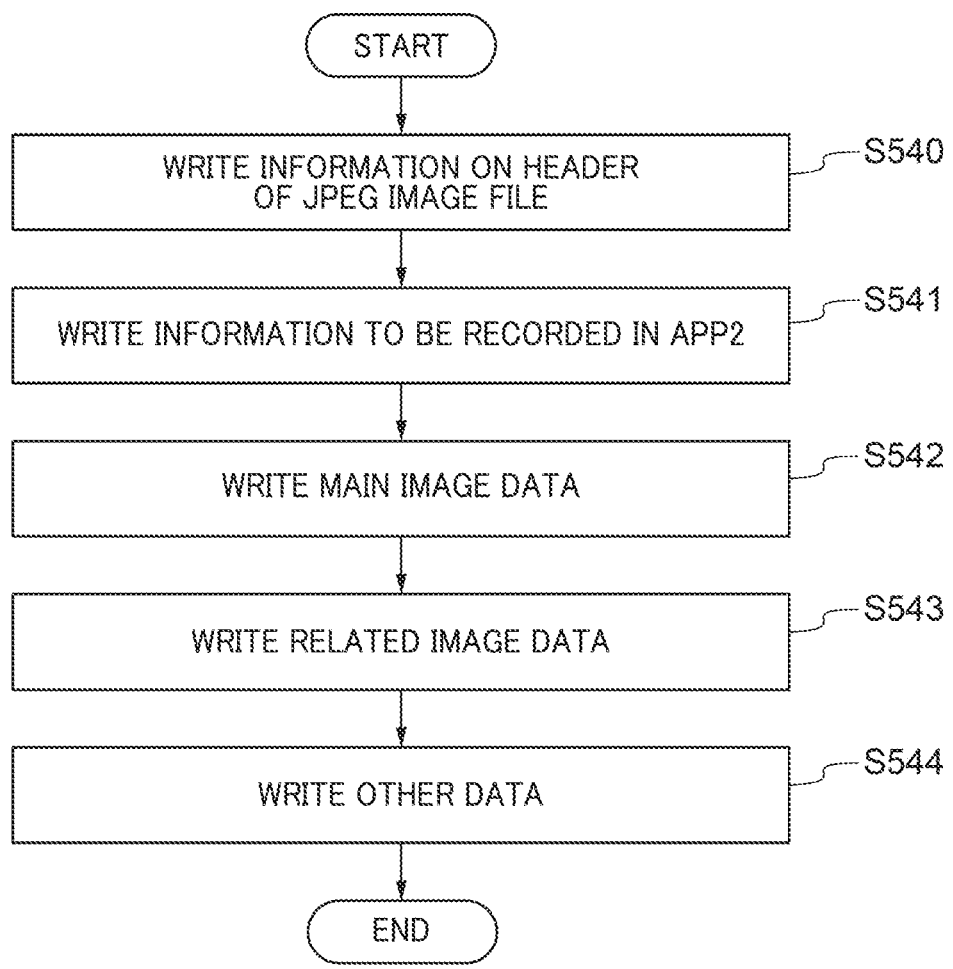
FIG. 5C is a flowchart showing the procedure of a JPEG image file storage process in step S507 in FIG. 5A.

FIG. 5C is a flowchart showing the procedure of the JPEG image file storage process in the step S507 in FIG. 5A.

In step S540, the system control unit 50A writes the information on the header of the JPEG image file, which was generated in the above-described header creating process, for example, the information stored in the first storage area into the external recording medium 91. Next, in step S541, the system control unit 50A writes the information to be recorded in the application marker 413 (APP2), which was generated in the above-described header creating process, for example, the information stored in the second storage area, into the external recording medium 91. Then, in step S542, the system control unit 50A writes the main image data 416 in the JPEG image file 400 into the external recording medium 91. After that, in step S543, the system control unit 50A writes the related image data 419 in the JPEG image file 400 into the external recording medium 91. Then, in step S544, the system control unit 50A writes the other data into the external recording medium 91. After that, the present process is ended.

According to the embodiment described above, in a case when the annotation information included in the HEIF image file is not predetermined annotation information whose data amount is equal to or greater than the predetermined value, the annotation information is recorded in the application marker in the JPEG image file. In a case when the annotation information in the HEIF image file is the predetermined annotation information, link information on the annotation information is recorded in the application marker in the JPEG file. It is thus possible to provide a post-conversion image file in which all of annotation information recorded in a pre-conversion image file can be used.

Moreover, in the embodiment described above, the predetermined annotation information is the related image data, and thus it is possible to provide a post-conversion image file in which related image data whose data amount is relatively large can be used.

Furthermore, in the embodiment described above, the related image data 419 is recorded in an area in the JPEG image file 400, which is different from area for the application markers 402, 413. Thus, it is possible to read out the related image data 419 from a post-conversion image file.

Figure 6A:
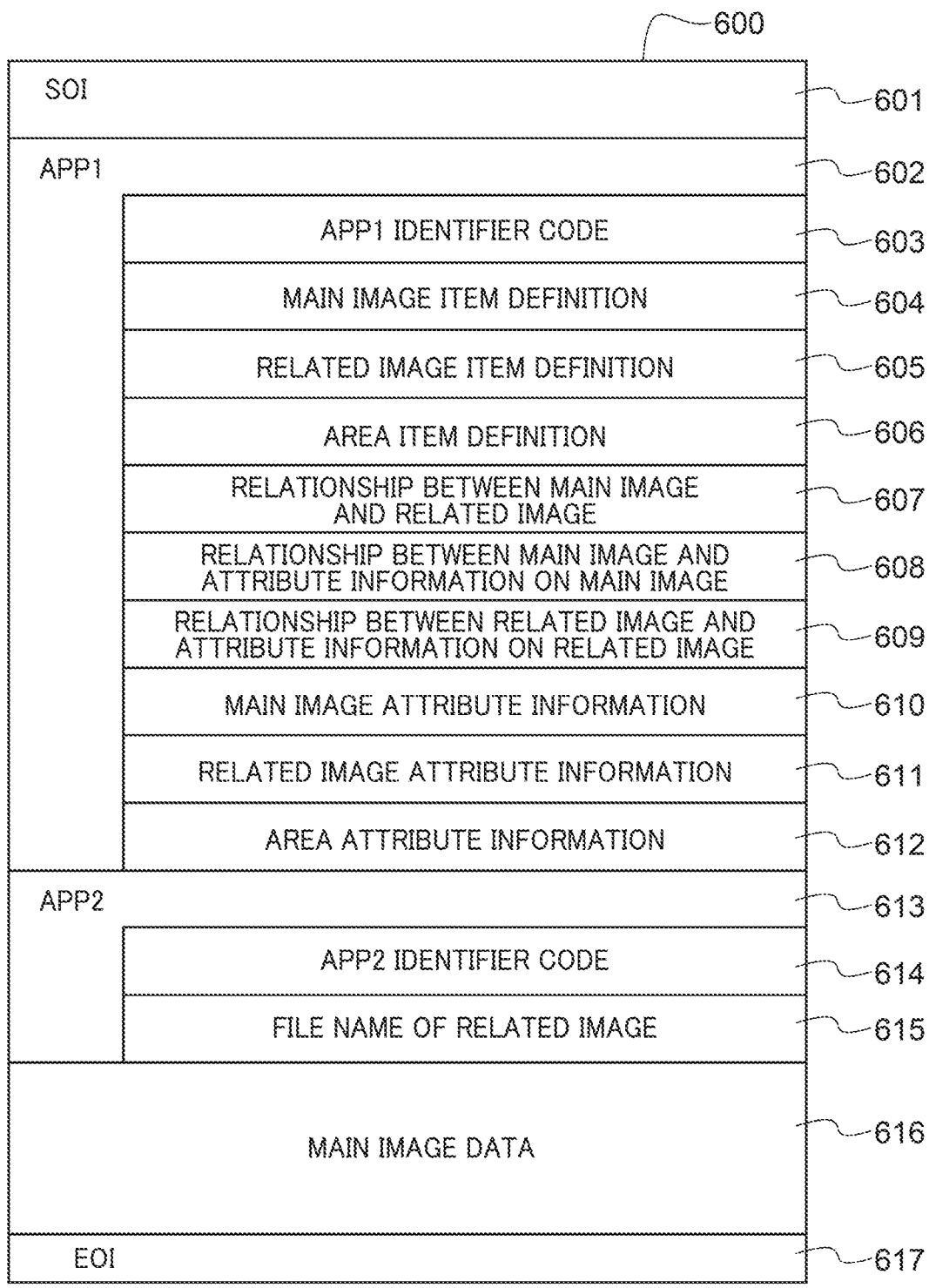
FIGS. 6A and 6B are views useful in explaining the configuration of an image file created by conversion of an HEIF image file in the embodiment of the present invention.
Figure 6B:
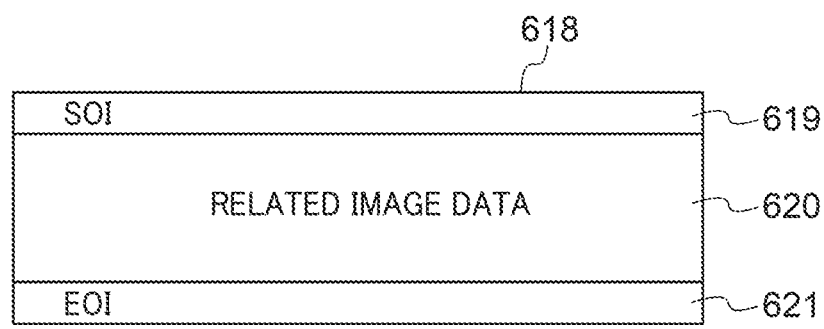

Although the present invention has been described by way of the embodiment, the present invention should not be limited to the embodiment described above. For example, as shown in FIGS. 6A and 6B, related image data 620 can be recorded in another image file 618 different from a post-conversion JPEG image file 600. In this case, for example, a file name of related image 615 is recorded as link information on the related image data 620, in an application marker 613 in the post-conversion JPEG image file 600. The file name of related image 615 is a file name of the image file 618 in which the related image data 620 is recorded. The configuration of the JPEG image file 600 differs from that of the JPEG image file 400 in FIG. 4 described above in that, in the JPEG image file 600, the file name of related image 615 is recorded, instead of the related image positional information 415, and the related image data 419 is not recorded. Otherwise, the configuration of the JPEG image file 600 is basically the same as that of the JPEG image file 400 in FIG. 4 described above.

Figure 7:
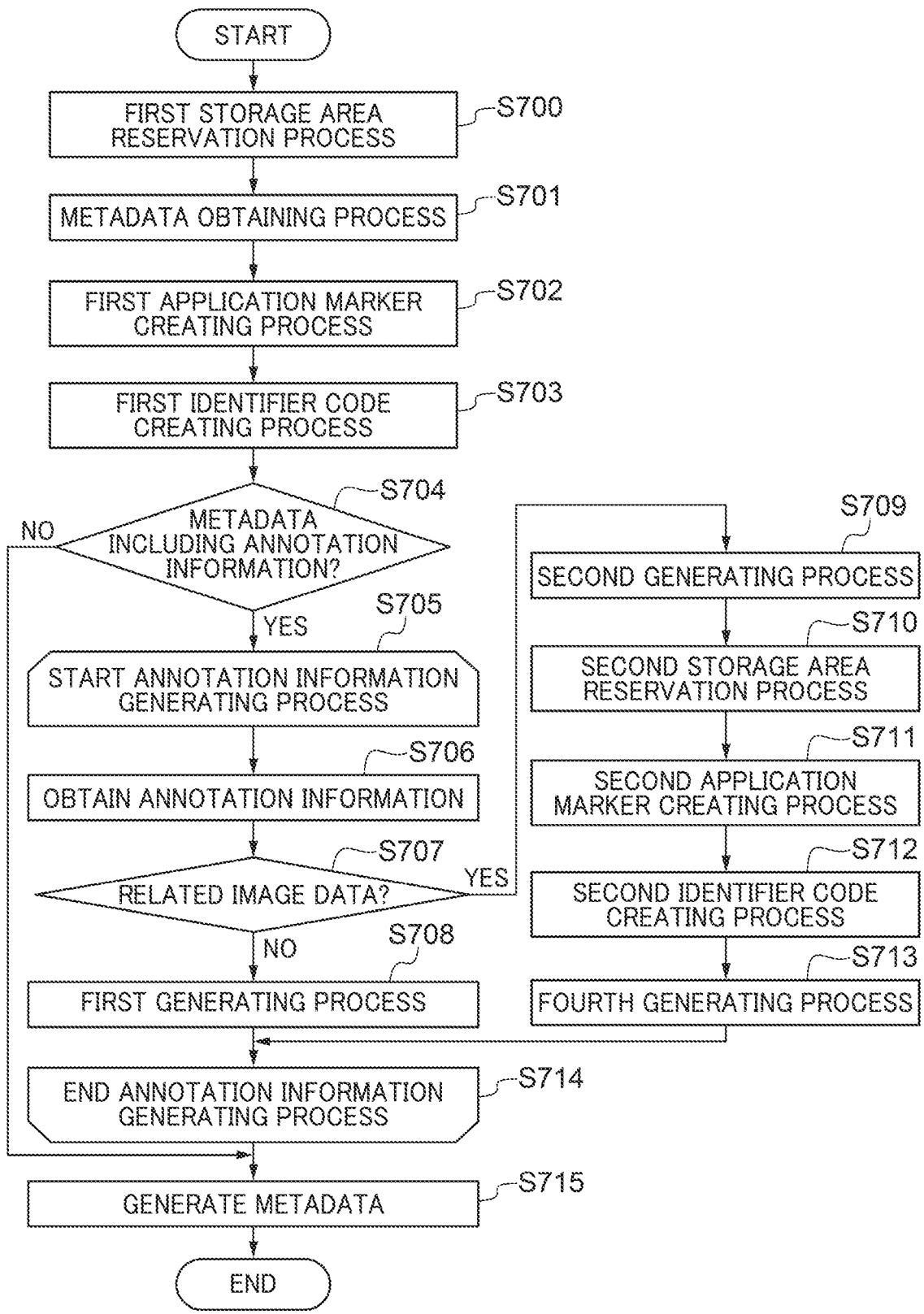
FIG. 7 is a flowchart showing another procedure of the header creating process in FIG. 5B.

FIG. 7 is a flowchart showing another procedure of the header creating process in FIG. 5B. It should be noted that the header creating process in FIG. 7 is similar to the header creating process in FIG. 5B, and description will be given below particularly of features different from those of the header creating process in FIG. 5B.

Referring to FIG. 7, processes in steps S700 to S707 that are similar to the processes in the steps S520 to S527 described above are carried out.

In a case when it is determined in the step S707 that the obtained annotation information is not the related image data, the process proceeds to step S708, which is similar to the process in the step S528 described above. Then, processes in steps S714 and S715, which are similar to the processes in the steps S534 and S535 described above, are carried out, and the present process is ended.

In a case when it is determined in the step S707 that the obtained annotation information is the related image data, the process proceeds to step S709, which is similar to the process in the step S529 described above. Then, processes in steps S710 and S712, which are similar to the processes in the steps S530 to S532 described above, are carried out. Then, in step S713, the system control unit 50A carries out a fourth generating process. In the fourth generating process, link information corresponding to the file name of related image 615 is generated as link information on the related image data. (In the third generating process, link information corresponding to the related image positional information 415 is generated as link information on the related image data as described above.) It should be noted that, in the present embodiment, the link information generated in the step S713 has only to be information that can identify the related image data, and should not necessarily be the file name of an image file in which the related image data is recorded. For example, the link information generated in the step S713 may be an ID, or the like, for identifying the related image data. The generated link information is stored in the second storage area reserved in the step S710. After that, processes in the steps S714 and S715 that are similar to the processes in the steps S534 and S535 described above are carried out, and the present process is ended.

Figure 8:
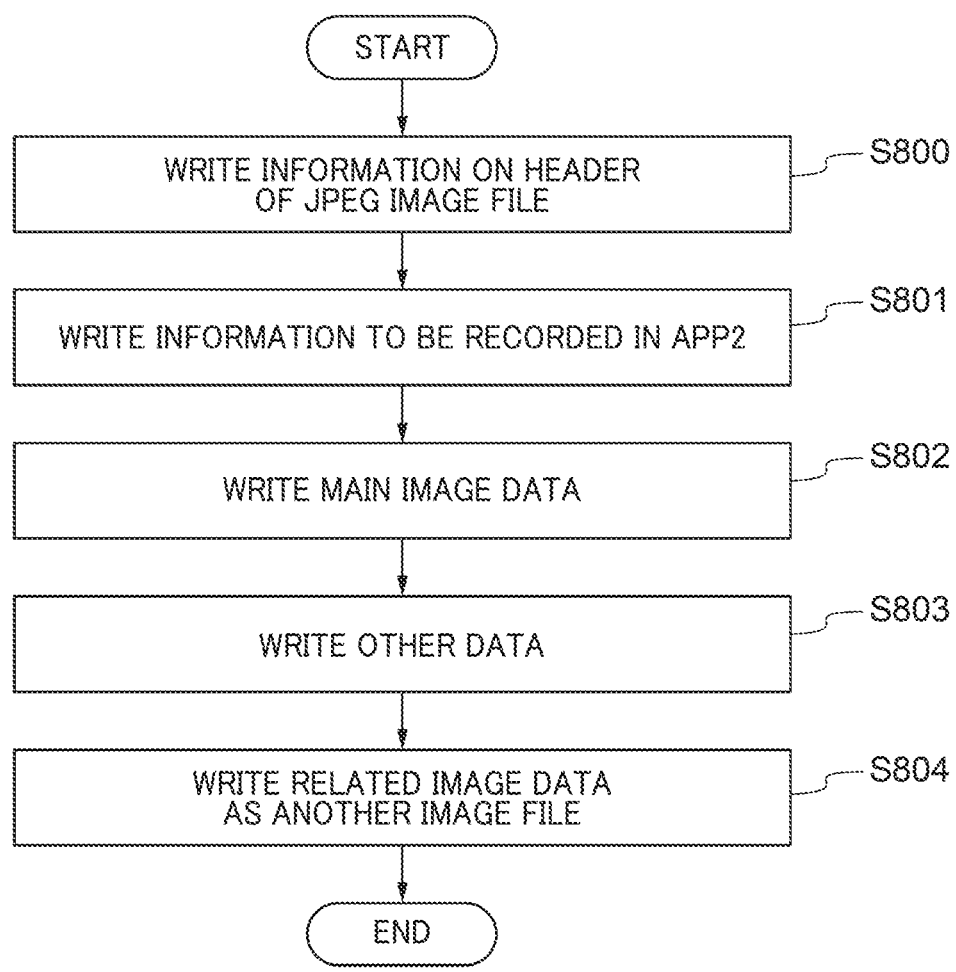
FIG. 8 is a flowchart showing another procedure of the JPEG image file storage process in FIG. 5C.

FIG. 8 is a flowchart showing another procedure of the JPEG image file storage process in FIG. 5C. It should be noted that the JPEG image file storage process in FIG. 8 is similar to the JPEG image file storage process in FIG. 5C, and a description will be given below particularly of features different from those of the JPEG image file storage process in FIG. 5C.

Referring to FIG. 8, processes in steps S800 to S802 that are similar to the processes in the steps S540 to S542 described above are carried out. Next, a process in step S803 that is similar to the process in the step S544 described above is carried out. Then, in the step S804, the system control unit 50A writes the related image data 620 as another image file 618 different from the JPEG image file 600 into the external recording medium 91. After that, the present process is ended.

Thus, also in the configuration in which the related image data is recorded in another image file different from a post-conversion image file, the related image data recorded in a pre-conversion image file can be used in the post-conversion image file.

It should be noted that, although in the embodiment described above, the related image data is treated as the predetermined annotation information whose data amount is equal to or greater than a predetermined value, the predetermined annotation information is not limited to the related image data. For example, the predetermined annotation information can be video data and/or audio data that are not allowed to be recorded in image files according to the JPEG standard.

In a case when the predetermined annotation information is video data and/or audio data, the predetermined annotation information is not recorded in a post-conversion image file but is recorded in another image file different from the post-conversion image file. Link information on the predetermined annotation information is recorded in an application marker in the post-conversion image file. The link information on the predetermined annotation information is a file name of the image file in which the predetermined annotation information is recorded, an ID for identifying the predetermined annotation information, or the like. Thus, even in a case when the predetermined annotation information is video data and/or audio data, similar effects to those in the embodiment described above can be achieved.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one memory that stores a set of instructions; and
at least one processor that executes the instructions, when being executed, causing the image processing apparatus:
to convert a first-format image file including image data and annotation information on the image data to a second-format image file, whose memory capacity of a predetermined area where annotation information is recorded, is less than that of the first-format image file,
wherein the at least one processor executes the instructions, causing the image processing apparatus:
in a case when the annotation information included in the first-format image file is not predetermined annotation information, whose data amount is equal to or greater than a predetermined value, to record the annotation information included in the first-format image file into the predetermined area in the second-format image file, and,
in a case when the annotation information included in the first-format image file is the predetermined annotation information, to record link information on the annotation information included in the first-format image file into the predetermined area in the second-format image file.

2. The image processing apparatus according to claim 1, wherein the predetermined annotation information is related image data related to the image data.

3. The image processing apparatus according to claim 2, wherein the predetermined annotation information is recorded in an area that is in the second-format image file, and is different from the predetermined area.

4. The image processing apparatus according to claim 2, wherein the predetermined annotation information is recorded in another image file different from the second-format image file.

5. The image processing apparatus according to claim 1, wherein the predetermined annotation information is video data or audio data.

6. The image processing apparatus according to claim 5, wherein the predetermined annotation information is recorded in another image file different from the second-format image file.

7. A control method for controlling an image processing apparatus, the control method comprising:
converting a first-format image file including image data and annotation information on the image data to a second-format image file, whose memory capacity of a predetermined area where annotation information is recorded, is less than that of the first-format image file; and in a case when the annotation information included in the first-format image file is not predetermined annotation information, whose data amount is equal to or greater than a predetermined value, recording the annotation information included in the first-format image file into the predetermined area in the second-format image file, and, in a case when the annotation information included in the first-format image file is the predetermined annotation information, recording link information on the annotation information included in the first-format image file into the predetermined area in the second-format image file.

8. A non-transitory storage medium storing a computer-executable program for causing a control method for an image processing apparatus, the control method comprising:

converting a first-format image file including image data and annotation information on the image data to a second-format image file, whose memory capacity of a predetermined area where annotation information is recorded, is less than that of the first-format image file; and, in a case when the annotation information included in the first-format image file is not predetermined annotation information, whose data amount is equal to or greater than a predetermined value, recording the annotation information included in the first-format image file into the predetermined area in the second-format image file, and, in a case when the annotation information included in the first-format image file is the predetermined annotation information, recording link information on the annotation information included in the first-format image file into the predetermined area in the second-format image file.

* * * * *